United States Patent
Kang et al.

(10) Patent No.: US 9,207,818 B2
(45) Date of Patent: Dec. 8, 2015

(54) FLEXIBLE TOUCH SCREEN PANEL AND FLEXIBLE DISPLAY DEVICE WITH THE SAME

(71) Applicant: SAMSUNG DISPLAY CO., LTD., Yongin-si, Gyeonggi-Do (KR)

(72) Inventors: Sung-Ku Kang, Yongin (KR); Tae-Hyeog Jung, Yongin (KR); Byeong-Kyu Jeon, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 271 days.

(21) Appl. No.: 13/772,246

(22) Filed: Feb. 20, 2013

(65) Prior Publication Data

US 2014/0139447 A1 May 22, 2014

(30) Foreign Application Priority Data

Nov. 20, 2012 (KR) .................. 10-2012-0131394

(51) Int. Cl.
*G06F 3/044* (2006.01)
*G06F 1/16* (2006.01)

(52) U.S. Cl.
CPC ............. *G06F 3/044* (2013.01); *G06F 1/1652* (2013.01); *G06F 2203/04102* (2013.01); *G06F 2203/04111* (2013.01)

(58) Field of Classification Search
CPC ......... G06F 3/044; G06F 3/045; G06F 3/041; G06F 3/0412; G06F 1/1652; G06F 1/1626; G06F 2203/04102; G06F 3/0414; G06F 1/1643; G06F 1/1647; G06F 3/0488; G02F 1/13338; G02F 1/133305

USPC .......................................................... 345/173
See application file for complete search history.

(56) References Cited

U.S. PATENT DOCUMENTS

| | | | |
|---|---|---|---|
| 5,610,528 A | 3/1997 | Neely et al. | |
| 7,082,578 B1* | 7/2006 | Fishkin et al. ................. | 715/863 |
| 7,443,380 B2* | 10/2008 | Nozawa ........................ | 345/156 |
| 2006/0238494 A1* | 10/2006 | Narayanaswami et al. ... | 345/156 |
| 2006/0274036 A1* | 12/2006 | Hioki et al. .................... | 345/156 |
| 2008/0291225 A1* | 11/2008 | Arneson ........................ | 345/698 |
| 2008/0303782 A1* | 12/2008 | Grant et al. .................... | 345/156 |
| 2009/0085891 A1* | 4/2009 | Yang et al. .................... | 345/174 |
| 2010/0011291 A1* | 1/2010 | Nurmi ........................... | 715/702 |
| 2010/0045705 A1* | 2/2010 | Vertegaal et al. ............. | 345/661 |
| 2010/0128002 A1* | 5/2010 | Stacy et al. ................... | 345/174 |
| 2010/0231126 A1* | 9/2010 | Choi ............................. | 313/504 |

(Continued)

FOREIGN PATENT DOCUMENTS

KR 10-2009-0087303 8/2009
KR 10-2013-0126007 A 11/2013

*Primary Examiner* — Priyank Shah
(74) *Attorney, Agent, or Firm* — Christie, Parker & Hale, LLP (57) ABSTRACT

A flexible touch screen panel includes a substrate, sensing patterns, sensing lines, and at least one bending sensor. The substrate is divided into an active area and a non-active area around the active area. The sensing patterns are on the active area of a first surface of the substrate. The sensing lines are on the non-active area of the first surface of the substrate and connected to the sensing patterns. The at least one bending sensor is implemented with a plurality of sensing patterns at an edge region in the active area. In the flexible touch screen panel, the substrate is configured to be bent along a folding axis in a first direction, and the at least one bending sensor is at a region along the folding axis.

17 Claims, 8 Drawing Sheets

(56) References Cited

U.S. PATENT DOCUMENTS

| | | | |
|---|---|---|---|
| 2011/0012845 A1* | 1/2011 | Rothkopf et al. | 345/173 |
| 2011/0227822 A1* | 9/2011 | Shai | 345/156 |
| 2012/0147299 A1* | 6/2012 | Park | 349/96 |
| 2012/0188153 A1* | 7/2012 | Tziortzis et al. | 345/156 |
| 2013/0285970 A1* | 10/2013 | Ahn et al. | 345/173 |
| 2013/0300678 A1 | 11/2013 | Kang et al. | |
| 2013/0321260 A1* | 12/2013 | Joo | 345/156 |
| 2014/0055702 A1* | 2/2014 | Park et al. | 349/43 |
| 2014/0062934 A1* | 3/2014 | Coulson et al. | 345/174 |
| 2014/0078088 A1* | 3/2014 | Seo et al. | 345/173 |
| 2014/0098095 A1* | 4/2014 | Lee et al. | 345/420 |

\* cited by examiner

FLEXIBLE TOUCH SCREEN PANEL AND FLEXIBLE DISPLAY DEVICE WITH THE SAME

CROSS-REFERENCE TO RELATED APPLICATION

This application claims priority to and the benefit of Korean Patent Application No. 10-2012-0131394, filed on Nov. 20, 2012, in the Korean Intellectual Property Office, the entire content of which is incorporated herein by reference.

BACKGROUND

1. Field

An aspect of the present invention relates to a touch screen panel, and more particularly, to a flexible touch screen panel and a flexible display device with the same.

2. Description of the Related Art

A touch screen panel is an input device that allows user's instructions to be inputted by selecting an instruction content displayed on a screen of an image display device or the like with a user's hand or object.

To this end, the touch screen panel is formed on a front face of the image display device to convert a contact position into an electrical signal. Here, the user's hand or object is directly in contact with the touch screen panel at the contact position. Accordingly, the instruction content selected at the contact position is inputted as an input signal to the image display device.

Because such a touch screen panel can be substituted for a separate input device connected to an image display device, such as a keyboard or mouse, its application to various fields has expanded.

Touch screen panels are divided into a resistive overlay touch screen panel, a photosensitive touch screen panel, a capacitive touch screen panel, and the like. The capacitive touch screen panel converts a contact position into an electrical signal by sensing a change in capacitance formed between a conductive sensing pattern and an adjacent sensing pattern, ground electrode, or the like, when a user's hand or object is in contact with the touch screen panel.

Generally, such a touch screen panel is frequently commercialized by being attached to an outer face of a flat panel display device such as a liquid crystal display device or organic light emitting display device. Therefore, touch screen panels require certain characteristics such as high transparency and thin thickness.

A flexible image display device has recently been developed, and in this case, a touch screen panel is attached to the flexible image display device. This type of display device requires flexibility.

However, in the related art, capacitive touch screen panels, sensing patterns, etc. are generally formed on a glass substrate, and the glass substrate has no less than a certain thickness to be conveyed in processes. Therefore, the glass substrate may not satisfy the thin characteristic required for flexible image display devices, and therefore may not be able to implement a desired flexibility.

SUMMARY

Embodiments provide a flexible touch screen panel having sensing patterns formed on a substrate having flexibility, in which a sensor sensing the presence of bending of the touch screen panel is integrally formed with the sensing patterns, so that it is possible to implement a thin structure and to reduce or minimize manufacturing cost.

Embodiments also provide a flexible touch screen panel in which an active area on which sensing patterns are formed based on a folding axis along which the touch screen panel is bent is divided into a plurality of areas, so that it is possible to prevent damage of the sensing patterns in a flexible environment.

Embodiments also provide a flexible display device having the flexible touch screen panel described above.

According to an aspect of the present invention, there may be provided a flexible touch screen panel including: a substrate comprising an active area and a non-active area around the active area; sensing patterns on the active area of a first surface of the substrate; and sensing lines on the non-active area of the first surface of the substrate and connected to the sensing patterns, wherein at least one bending sensor is implemented with a plurality of the sensing patterns at an edge region in the active area, wherein the substrate is configured to be bent along a folding axis in a first direction, and the at least one bending sensor is at a region along the folding axis.

The sensing patterns may include first sensing cells coupled together along the first direction; first connecting lines coupling adjacent ones of the first sensing cells; second sensing cells coupled together along a second direction; and second connecting lines coupling adjacent ones of the second sensing cells.

The at least one bending sensor may be implemented with two adjacent ones of the first sensing cells and a second sensing cell adjacent one of the two adjacent ones of the sensing cells.

The folding axis may be between the two adjacent ones of the first sensing cells that constitute the at least one bending sensor.

The sensing cells at the region along the folding axis may be separated into cell portions.

The cell portions may be spaced apart from each other along the folding axis and may not overlap with the folding axis. Alternatively, each of the cell portions may include a protruding portion that overlaps with the folding axis.

The active area having the sensing patterns thereon may include a plurality of sub-active areas based on the folding axis.

Sensing patterns on the sub-active areas may be configured to operate while the sensing patterns are separated from each other.

The substrate may include a polyimide material.

The sensing patterns on different ones of the sub-active areas may be connected to a pad portion by different ones of the sensing lines arranged on different regions of the non-active area.

The different ones of the sensing lines extending from the sub-active areas may be connected to the pad portion located at one end of the non-active area. Alternatively, different ones of the sensing lines extending from different ones of the sub-active areas may be connected to a plurality of pad portions located at different regions of the non-active area.

A portion of each of the sensing lines crossing the folding axis may be branched into a plurality of lines. Alternatively, a portion of each of the sensing lines crossing the folding axis may have a larger width than portions of the sensing lines formed on other regions.

A plurality of holes may be formed in the portion having a larger width.

A portion of each of the sensing lines crossing the folding axis may be a connecting portion comprising a material different from that of each of the sensing lines, and wherein the connecting portion is electrically connected to the sensing lines through contact holes.

According to another aspect of the present invention, there is provided a flexible display device with a flexible touch screen panel including: a substrate comprising an active area and a non-active area positioned around the active area; sensing patterns on the active area of a first surface of the substrate; and sensing lines on the non-active area of the first surface of the substrate and connected to the sensing patterns, wherein at least one bending sensor is implemented with a plurality of the sensing patterns positioned at an edge region in the active area, wherein the flexible display device is attached to the flexible touch screen panel so as to face the sensing patterns and the sensing lines in the direction of the first surface of the substrate, and wherein the substrate is configured to be bent along a folding axis in a first direction, and the at least one bending sensor is at a region along the folding axis.

The flexible display device may be implemented as an organic light emitting display device. A polarizing film and a window substrate may be sequentially attached to a second surface of the substrate using a transparent adhesive.

As described above, according to embodiments of the present invention, a sensor for sensing the presence of bending of the touch screen panel is integrally formed with the sensing patterns, so that it is possible to implement a thin structure and to reduce or minimize manufacturing cost.

Further, an active area on which sensing patterns are formed based on a folding axis about which the touch screen panel is bent is divided into a plurality of areas, so that it is possible to reduce or prevent damage of the sensing patterns in a flexible environment.

Further, sensing lines are implemented using a form or material that is durable during repeated bending and unbending with respect to a region where the sensing lines intersect the folding axis, so that it is possible to reduce or prevent damage of the sensing lines in a flexible environment.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it may be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, exemplary embodiments of the present invention will be described in detail with reference to the accompanying drawings.

Figure 1:
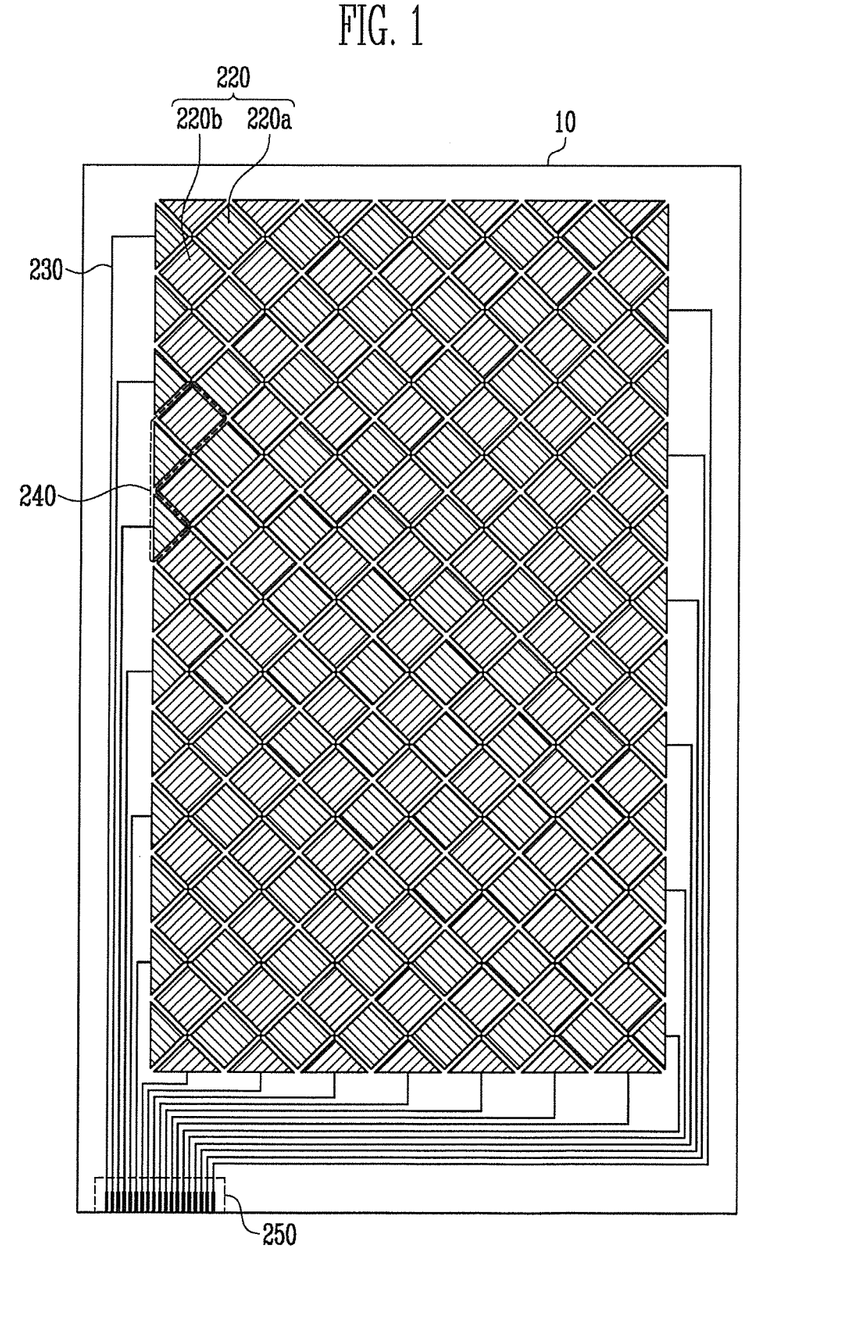
FIG. 1 is a plan view schematically showing a touch screen panel according to an embodiment of the present invention.
Figure 2A:
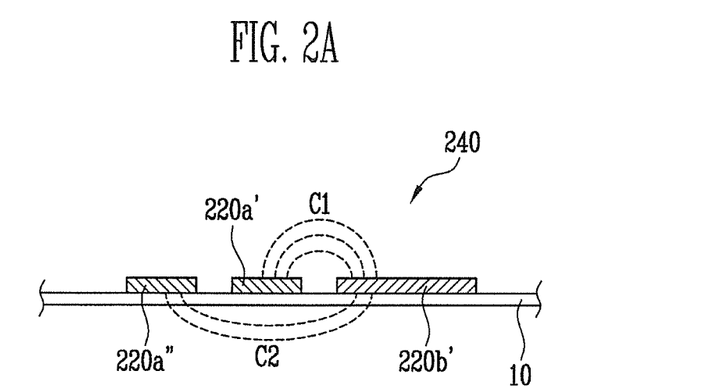
FIGS. 2A and 2B are views illustrating the structure and operation of a bending sensor according to an embodiment of the present invention.
Figure 2B:
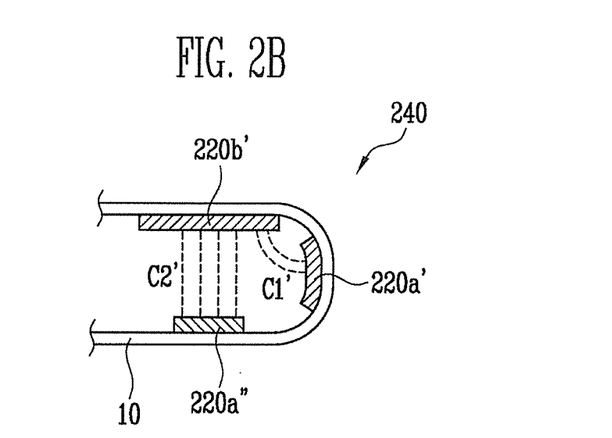

FIG. 1 is a plan view schematically showing a touch screen panel according to one embodiment of the present invention. FIGS. 2A and 2B are views illustrating the structure and operation of a bending sensor according to one embodiment of the present invention.

First, referring to FIG. 1, the touch screen panel according to this embodiment includes a substrate 10 having flexibility and divided into an active area and a non-active area positioned at the outside of (e.g., surrounding or around) the active area; sensing patterns 220 formed on the active area of a first surface of the substrate 10; and sensing lines 230 formed on the non-active area of the first surface of the substrate 10, and connecting the sensing patterns 220 to an external driving circuit (not shown) through a pad portion 250.

The sensing lines 230 are electrically connected to row lines of the first sensing cells 220a and column lines of the second sensing cells 220b, respectively, so as to connect the row and column lines to the external driving circuit (not shown), such as a position detecting circuit, through the pad portion 250.

The sensing lines 230 are arranged on the non-active area formed at the outside of the active area in which an image is displayed. The sensing lines 230 may be formed from a wide selection of materials. The sensing lines 230 may be formed of not only a transparent electrode material used to form the sensing patterns 220, but also a low-resistance metallic material such as molybdenum (Mo), silver (Ag), titanium (Ti), copper (Cu), aluminum (Al) or Mo/Al/Mo.

The substrate 10 having the flexibility is fabricated or formed using a material having high thermal resistance and chemical resistance. In this embodiment, polyimide (PI) is used as the material of the substrate 10 and therefore will be described as a non-limiting example.

That is, the touch screen panel according to this embodiment does not use an existing rigid material (e.g., glass, polyethylene terephthalate (PET), polycarbonate (PC), etc.), but uses a PI having excellent thermal resistance for the material of the substrate 10.

In this case, the thickness of the substrate 10 may be about 0.005 mm to about 0.05 mm. In one embodiment, the thickness may be about 0.01 mm (10 μm), thereby securing flexibility. Therefore, the substrate 10 having this thickness may have flexibility and may be bent, unlike the existing glass substrate.

Accordingly, the touch screen panel according to this embodiment is implemented with a sensor sensing the presence of bending of the substrate 10, i.e., a bending sensor 240. That is, in this embodiment, the presence of bending of the substrate 10 is sensed so that it is possible to implement various user interfaces for converting information through the touch screen panel to be suitable for the shape of a product, changed by the bending of the touch screen panel, partially turning off a screen of the product, etc.

Further, in this embodiment, the bending sensor 240 is integrally formed with the sensing patterns. Accordingly, the bending sensor other than the sensing patterns is not separately provided so that it is possible to implement a thin structure and reduce or minimize manufacturing cost.

To this end, as shown FIG. 1, the bending sensor 240 may be implemented with two first sensing cells 220a and one second sensing cell 220b positioned at an edge region on the active area. More specifically, the bending sensor 240 is formed by two first sensing cells 220a vertically adjacent to each other and a second sensing cell 220b positioned adjacent to one of the two first sensing cells 220a.

Although it has been illustrated in FIG. 1 that only one bending sensor 240 is implemented, the present invention is not limited thereto. That is, the bending sensor 240 may be implemented with one or more bending sensors. For example, the bending sensor 240 may be implemented in a continuous array form at an edge of the active area.

Since the bending sensor 240 performs the function of sensing the presence of bending of the substrate 10, the bending sensor 240 is formed in a region where the substrate 10 is bent. Therefore, in a case where there exists only one bending region, i.e., only one folding axis about which the substrate 10 is bent, only one bending sensor 240 may be provided. However, in a case where several folding axes exist, bending sensors are necessarily provided at edge regions of the active area, corresponding to the folding axes.

The first and second sensing cells constituting the bending sensor 240 perform an operation of sensing a touch position and an operation of sensing the presence of bending of the substrate 10.

These operations can be separately performed in different periods. That is, the operation of sensing a touch position is performed in a period where the sensing patterns 220 on the active area, including the first and second sensing cells constituting the bending sensor 240, sense the touch position, and the operation of the presence of bending of the substrate 10 is performed in a period where the first and second sensing cells constituting the bending sensor 240 sense the presence of bending of the substrate 10.

For example, assuming that the period where the touch position is sensed is one frame period when an image is displayed, the period when the presence of bending of the substrate 10 is sensed may be set to be a period between the frame periods.

Hereinafter, the operation of sensing the presence of bending of the substrate 10 using the bending sensor 240 will be described with reference to FIGS. 2A and 2B.

FIG. 2A is a view showing a structure of the bending sensor 240 in a state in which the substrate 10 is unfolded. FIG. 2B is a view showing a structure of the bending sensor 240 in a state in which the substrate 10 is bent.

In the embodiment shown in FIGS. 2A and 2B, a case where the folding axis about which the substrate 10 is bent and crosses a (1-1)-th sensing cell 220a' will be described as an example.

The bending sensor 240 according to this embodiment, as described above, is implemented with adjacent two first sensing cells, i.e., a (1-1)-th sensing cell 220a' and a (1-2)-th sensing cell 220a", and a second sensing cell 220b' positioned adjacent to the (1-1)-th sensing cell 220a' of the two adjacent sensing cells.

Before the substrate 10 is bent as shown in FIG. 2A, the capacitance C2 between the second sensing cell 220b' and the (1-2)-th sensing cell 220a" is smaller than the capacitance C1 between the second sensing cell 220b' and the (1-1)-th sensing cell 220a' adjacent to the second sensing cell 220b'. However, in a case where the substrate 10 is bent as shown in FIG. 2B, the distance between the second sensing cell 220b' and the (1-2)-th sensing cell 220a" is reduced so that the variation ($\alpha C2 = C2 - C2'$) in capacitance between the second sensing cell 220b' and the (1-2)-th sensing cell 220a" is relatively greater than the variation ($\alpha C1 = C1 - C1'$) in capacitance between the second sensing cell 220b' and the (1-1)-th sensing cell 220a'.

That is, in this embodiment, the presence of bending of the substrate 10 can be sensed by sensing the variation in capacitance between the sensing cells provided in the bending sensor 240.

In the embodiment shown in FIGS. 1, 2A, and 2B, a case where a bending region of the substrate 10 is not set has been described as an example. However, if the bending region is not set as described above, the sensing cells formed in the region intersecting the folding axis may crack and deteriorate.

Accordingly, in another embodiment, a configuration in which the folding axis about which the substrate 10 is bent and the active area having the sensing patterns formed thereon is divided into a plurality of areas based on the folding axis. This embodiment will now be described.

Figure 3:
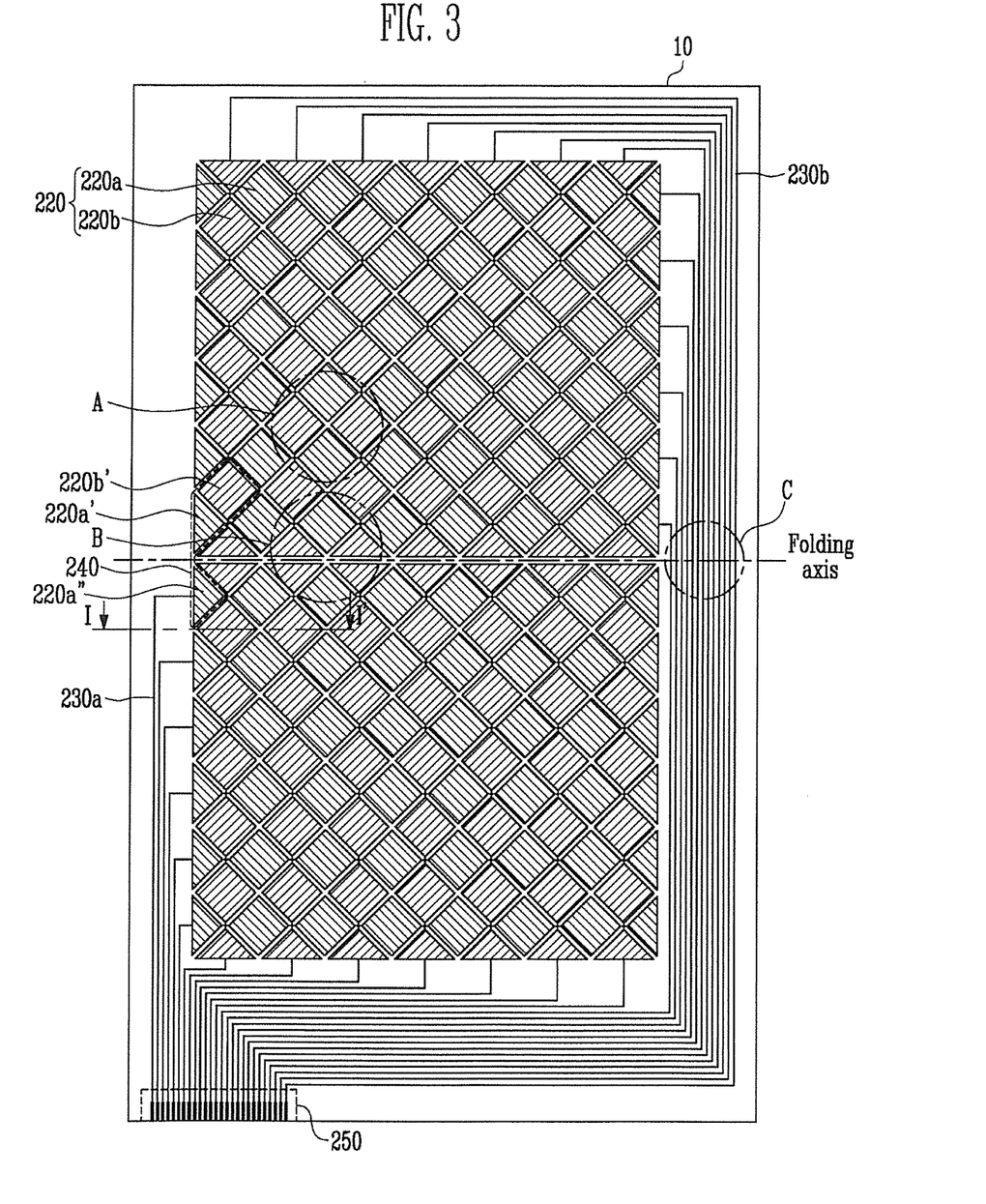
FIG. 3 is a plan view schematically showing a touch screen panel according to another embodiment of the present invention.
Figure 4:
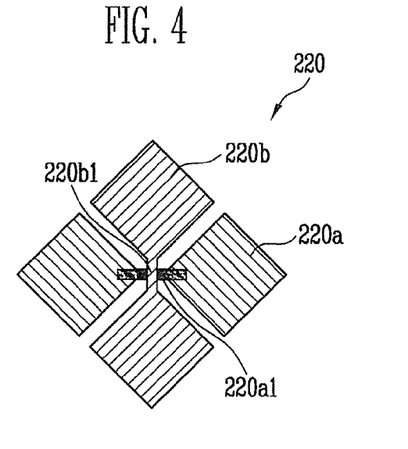
FIG. 4 is an enlarged view showing an example of a sensing pattern of region A shown in FIG. 3.
Figure 5A:
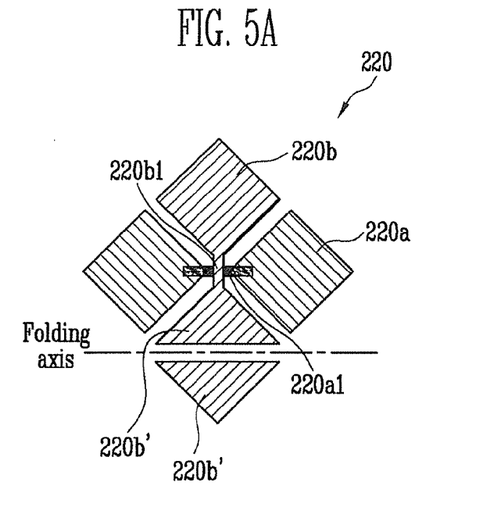
FIGS. 5A and 5B are enlarged views showing an example of a sensing pattern of region B shown in FIG. 3.
Figure 5B:
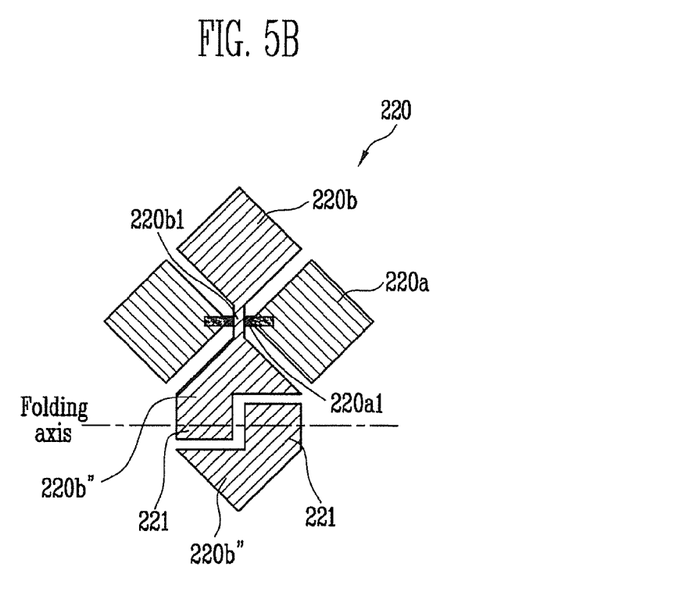

FIG. 3 is a plan view schematically showing a touch screen panel according to another embodiment of the present invention. FIG. 4 is an enlarged view showing an example of a sensing pattern of region A shown in FIG. 3. FIGS. 5A and 5B are enlarged views showing an example of a sensing pattern of region B shown in FIG. 3.

Referring to FIGS. 3 to 5, the touch screen panel according to this embodiment will be compared with the touch screen panel according to the embodiment shown in FIG. 1. When the flexible substrate 10 is repetitively bent along a folding axis in a first direction, and the sensing patterns 220 are formed on the substrate 10, sensing patterns positioned at the boundary of the folding axis are spaced apart from each other at an interval about the folding axis. Accordingly, the active area having the sensing patterns 220 formed thereon is divided into a plurality of areas, thereby preventing the sensing patterns formed on the region where the substrate 10 is repetitively bent from cracking and deteriorating.

In the embodiment shown in FIG. 3, only one folding axis exists, and therefore, the active area is vertically divided into two areas (e.g., an upper area and a lower area) based on the folding axis. However, the present invention is not limited thereto. For example, in a case where two folding axes exist in the first direction, the active area may be divided into three areas based on the two folding axes.

In this case, the bending sensor 240 that senses the presence of the bending of the substrate 10 is formed at a region intersecting (or about) the folding axis as shown in FIG. 3.

That is, the bending sensor 240 is implemented with adjacent two first sensing cells, i.e., a (1-1)-th sensing cell 220a' and a (1-2)-th sensing cell 220a", and a second sensing cell 220b' positioned adjacent to the (1-1)-th sensing cell 220a' of the two adjacent sensing cells, and the folding axis crosses between the (1-1)-th sensing cell 220a' and (1-2)-th sensing cell 220a" as shown in this figure.

The operation of the bending sensor 240 is substantially the same as that described with reference to FIGS. 1 and 2.

In the embodiment shown in FIG. 3, among the sensing patterns formed on the active area of the touch screen panel, sensing patterns having normal shapes are formed on a region (e.g., the region A) not positioned at or near the boundary of the folding axis, and sensing patterns having shapes separated from each other are formed on a region (e.g., the region B) positioned at or near the boundary of the folding axis.

When the active area is divided into a plurality of areas based on the folding axis, the sensing patterns formed on the divided active areas (first and second active areas) are operated in a state in which the sensing patterns are electrically separated from each other.

That is, in the embodiment of FIG. 3, first sensing lines 230a electrically connected to first and second sensing cells of the sensing patterns formed on the active area (first active area) positioned below the folding axis are arranged on the non-active area at the left side of the active area.

On the other hand, second sensing lines 230b electrically connected to first and second sensing cells of the sensing patterns formed on the active area (second active area) positioned above the folding axis are arranged on the non-active area at the right side of the active area.

In the embodiment of FIG. 3, the first and second sensing lines 230a and 230b extending from the first and second active areas, respectively, are connected to one pad portion 250 formed at a lower end of the non-active area as shown in this figure. And therefore, there exists a region (region C) where the second sensing lines 230b extending from the second active area intersect or cross the folding axis.

Accordingly, in this embodiment, the second sensing lines 230b are implemented using a form or material that is durable during repeated bending and unbending at region C, where the second sensing lines 230b intersect (or cross) the folding axis, so that it is possible to prevent damage of the sensing lines 230b in a flexible environment. The structure of the second sensing lines corresponding to region C will be described in detail below with reference to FIG. 6.

The configuration of the touch screen panel according to this embodiment is described as follows.

First, the sensing patterns 220 formed on the region (region A) not positioned at or near the boundary of the folding axis, as shown in FIG. 4, include a plurality of first sensing cells 220a formed to be connected for each row line along a first direction (e.g., a row direction), a plurality of first connecting lines 220a1 connecting the first sensing cells 220a along the row direction, a plurality of second sensing cells 220b formed to be connected for each column line along a second direction (e.g., a column direction), and a plurality of second connecting lines 220b1 connecting the second sensing cells 220b along the column direction.

For convenience of illustration, only a portion of the sensing patterns is shown in FIG. 4. However, the touch screen panel according to this embodiment has a structure in which the sensing patterns shown in FIG. 4 are repetitively arranged on the active area except for the region (region B) intersecting or crossing the folding axis. That is, in the embodiment shown in FIG. 1, the sensing patterns shown in FIG. 4 are repetitively arranged on the entire active area.

The first sensing cells 220a and the second sensing cells 220b are alternately arranged so as not to overlap with each other and the first connecting lines 220a1 and the second connecting lines 220b1 cross each other. In this case, an insulation layer (not shown) for securing stability is interposed between the first connecting lines 220a1 and the second connecting lines 220b1.

Meanwhile, the first sensing cells 220a may be integrally formed with the first connecting lines 220a1 using a transparent conductive material such as indium tin oxide (hereinafter, referred to as ITO) or may be formed separately from the first connecting lines 220a1 so that the first sensing cells 220a and the first connecting lines 220a1 are electrically connected to each other. The second sensing cells 220b may be integrally formed with the second connecting lines 220b1 using a transparent conductive material such as ITO or may be formed separately from the second connecting lines 220b1 so that the second sensing cells 220b and the second connecting lines 220b1 are electrically connected to each other.

For example, the second sensing cells 220b are integrally formed with the second connecting lines 220b1 by being patterned in the column direction. The first sensing cells 220a are patterned to independent patterns between respective second sensing cells 220b, and may be connected along the row direction by the first connecting lines 220a1 positioned above or below the first sensing patterns 220a.

In this case, the first connecting lines 220a1 may be electrically connected to the first sensing cells 220a by being directly contacted with the first sensing cells 220a above or below the first sensing cells 220a. Alternatively, the first connecting lines 220a1 may be electrically connected to the first sensing cells 220a through contact holes, etc.

The first connecting lines 220a1 may be formed using a transparent conductive material such as ITO or using an opaque low-resistance metal material. The first connecting lines 220a1 may be formed by adjusting their width, etc. so that the visibility of the patterns is reduced or prevented.

Next, as shown in FIGS. 5A and 5B, the basic configuration of sensing patterns 220 formed on the region (region B) positioned at the boundary of the folding axis is the same as that of the sensing patterns 220 shown in FIG. 4, but only the shape of a sensing cell, i.e., a second sensing cell 220b' or 220b" formed on the region crossed by the folding axis is different from that of the sensing cell 220b shown in FIG. 4. Thus, for convenience of illustration, components of this embodiment identical to those of the embodiment shown in FIG. 4 are designated by like reference numerals, and their detailed descriptions will be omitted.

The touch screen panel according to this embodiment is implemented by forming the sensing patterns on the substrate having flexibility, and the bending of the touch screen panel is repetitively performed along the folding axis.

In a case where the sensing patterns positioned at the boundary of the folding axis is implemented in the shape shown in FIG. 4, the sensing cells positioned at the boundary of the folding axis about which the bending of the touch screen panel is repeated may become cracked and deteriorated. In order to solve such a problem, in this embodiment, the sensing cells 220b' or 220b" formed on the region crossing or along the folding axis are spaced apart from each other across the folding axis about which the touch screen panel is bent, as shown in FIGS. 5A and 5B.

First, referring to the embodiment of FIG. 5A, the second sensing cells 220b' formed at the region along or crossing the folding axis are vertically spaced apart from each other at a distance or an interval so as not to overlap with the folding axis. That is, the second sensing cell 220b' is divided into upper and lower sensing cell portions and the upper and lower sensing cell portions are not electrically connected to each other.

Thus, in the touch screen panel according to this embodiment, the active area is divided into a plurality of areas based on the folding axis as shown in FIG. 3, and sensing patterns respectively formed on the divided active areas (first and second active areas) are operated in a state in which the sensing patterns are electrically separated (or insulated) from each other.

That is, in the embodiment of FIG. 3, the sensing patterns formed on the lower active area (first active area) below the folding axis are connected to the pad portion 250 through the first sensing lines 230a, and the sensing patterns formed on the upper active area (second active area) above the folding axis are connected to the pad portion 250 through the second sensing lines 230b.

The touch screen panel according to this embodiment described above is a capacitive touch screen panel. If a contact object such as a user's finger or stylus pen comes in contact with the touch screen panel, a change in capacitance caused by a contact position is transferred from the sensing patterns 220 respectively formed on the first and second active areas to the driving circuit (not shown) via the first and second sensing lines 230a and 230b and the pad portion 250. Then, the change in capacitance is converted into an electrical signal by X and Y input processing circuits (not shown), thereby detecting the contact position.

However, according to the embodiment shown in FIG. 5A, the area of the divided sensing cells 220b' positioned on the boundary of the folding axis is about ½ the size of the sensing cells formed on other regions, and therefore, the sensitivity of the sensing cells 220b' is decreased.

In order to solve such a problem, in the embodiment shown in FIG. 5B, the divided second sensing cells 220b'' positioned on the folding axis is implemented to have a wider area.

To this end, in the embodiment of FIG. 5B, each of the second sensing cells 220b'' positioned above and below the boundary of the folding axis is further provided with a protruding portion 221 formed so that a portion of the second sensing cell 220b'' overlaps with the folding axis.

In this case, the protruding portion 221 is integrally formed with the second sensing cell 220b'', and the upper and lower sensing cells 220b'' divided along the folding axis are separated from each other as shown in this figure. However, this embodiment is different from the embodiment of FIG. 5A in that the protruding portion 221 of each sensing cell 220b'' overlaps with the folding axis.

Through the configuration described above, the area of the sensing cells 220b'' positioned on the boundary of the folding axis is increased, thereby reducing or preventing a decrease in sensing sensitivity.

Here, it is likely that the region of the protruding portion 221 overlapping with the folding axis may be damaged by the repetitive bending of the touch screen panel. However, according to the structure of FIG. 5B, the second sensing cells 220b'' each having the protruding portion 221 are vertically separated from each other, and thus there is no problem in the operation of the second sensing cell 220b'' even though the protruding portion 221 may be damaged.

As described above, in the embodiment of FIG. 3, the first and second sensing lines 230a and 230b extending from the first and second active areas, respectively, are connected to the one pad portion 250 formed at a lower end of the non-active area as shown in FIG. 3, and therefore, there occurs a region (region C) where the second sensing lines 230b extending from the second active area intersect or cross the folding axis.

Accordingly, in this embodiment, the second sensing lines 230b are implemented using a form or material that is durable during repeated bending and unbending with respect to the region (region C) where the second sensing lines 230b intersect or cross the folding axis.

FIGS. 6A to 6D are enlarged views showing an example of a sensing pattern of region C shown in FIG. 3.

Figure 6A:
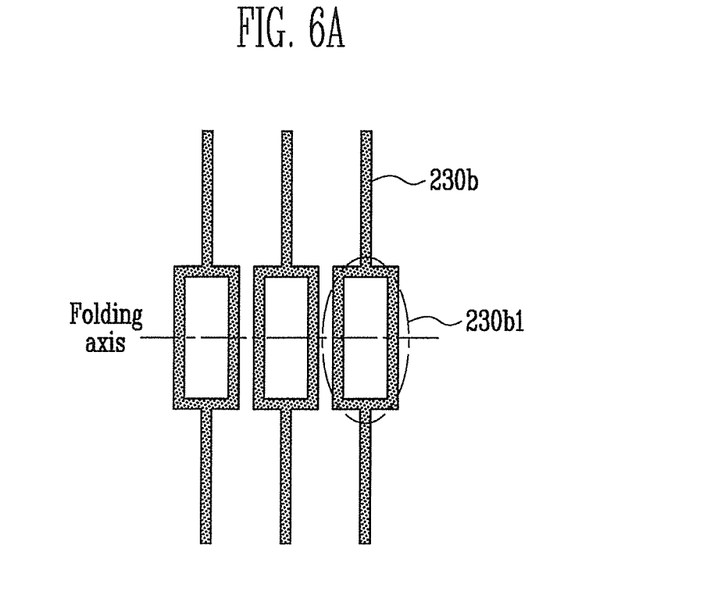
FIGS. 6A to 6D are enlarged views showing an example of a sensing pattern of region C shown in FIG. 3.

First, referring to the embodiment of FIG. 6A, a portion 230b1 of the second sensing line 230b, corresponding to the region C intersecting or crossing the folding axis, is branched into a plurality of lines. According to the structure described above, although one of the plurality of lines 230b1 overlapping with the folding axis may be damaged by the repetitive bending of the touch screen panel, the normal operation of the second sensing line 230b can still be performed by the other lines.

Figure 6B:
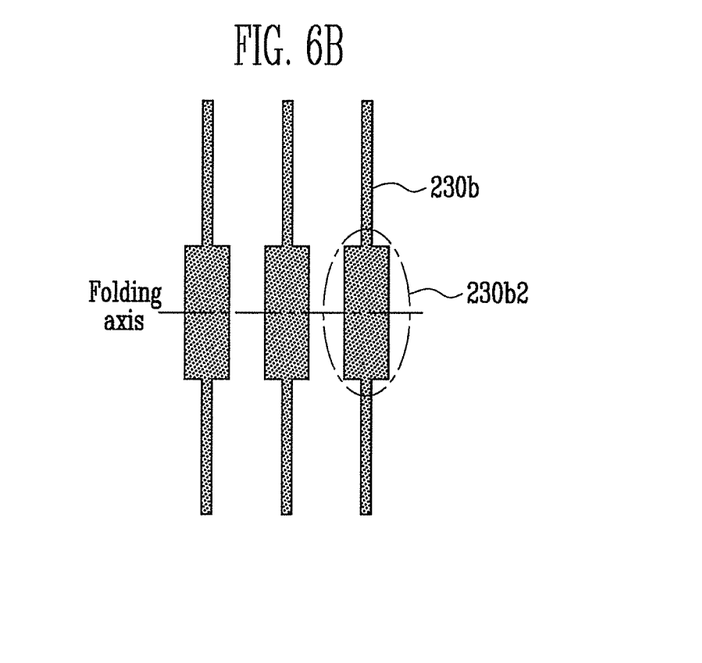

Next, referring to the embodiment of FIG. 6B, a portion 230b2 of the second sensing line 230b, corresponding to region C intersecting or crossing the folding axis, has a broad area as compared with the second sensing lines formed on the other regions. That is, the width of the second sending line corresponding to region C is formed wider than that of the second sensing line formed on another region so that the second sensing line is not damaged by the repetitive bending of the touch screen panel along the folding axis.

Figure 6C:
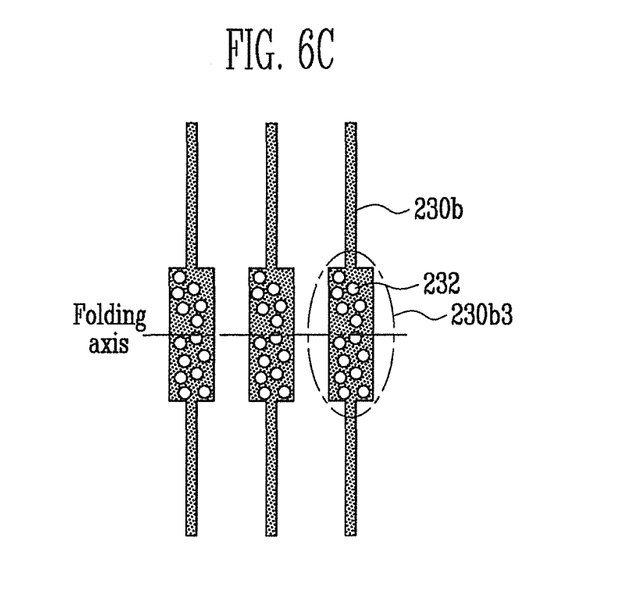

Next, referring to the embodiment of FIG. 6C, a portion 230b3 of the second sensing line 230b, corresponding to the region C intersecting the folding axis, has a broad area as compared with the second sensing lines formed on other regions. A plurality of holes 232 are further formed in the portion 230b3 having the broad area. That is, the width of the second sending line corresponding to the region C is formed wider than that of the second sensing line formed on another region so that the second sensing line is not damaged by the repetitive bending of the touch screen panel along the folding axis, and the holes 232 perform a function of preventing cracks from being locally generated by the repetitive bending of the touch screen panel.

Figure 6D:
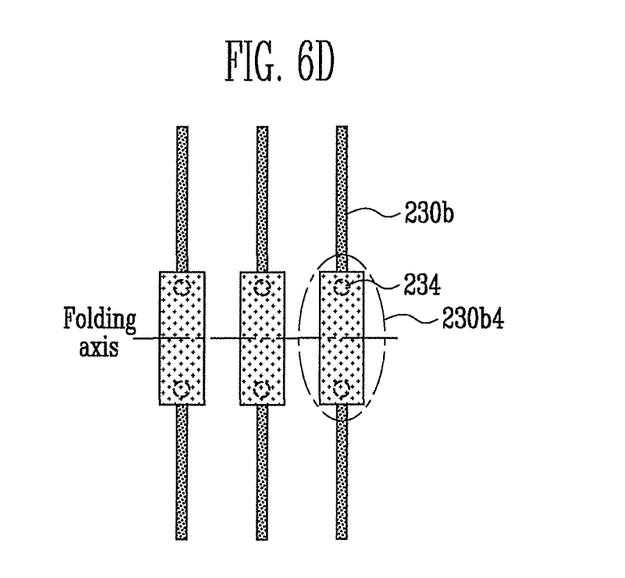

Finally, referring to the embodiment of FIG. 6D, the second sensing line 230b is implemented into a structure in which a portion 230b4 of the second sensing line 230b, corresponding to the region C intersecting or crossing the folding axis, is formed as a connecting portion made of a material having excellent bendability, and the connecting portion is connected to the second sensing lines formed on the other regions through contact holes 234.

In this case, the connecting portion may be made of a PEDOT-based organic conductive material or a flexible metal material such as copper (Cu).

In the embodiments described with reference to FIGS. 3 to 6, the first and second sensing lines 230a and 230b extending from the first and second active areas, respectively, are connected to the one pad portion 250 formed at a lower end of the non-active area.

According to the structure described above, there occurs a region (region C) where the second sensing lines 230b extending from the second active area intersect or cross the folding axis, and there is an inconvenience in that the second sensing lines 230b are implemented using a form or material that is durable during repeated bending and unbending with respect to the region (region C) where the second sensing lines 230b intersect or cross the folding axis.

Accordingly, a touch screen panel according to another embodiment is implemented so that sensing lines do not intersect or cross the folding axis.

Figure 7:
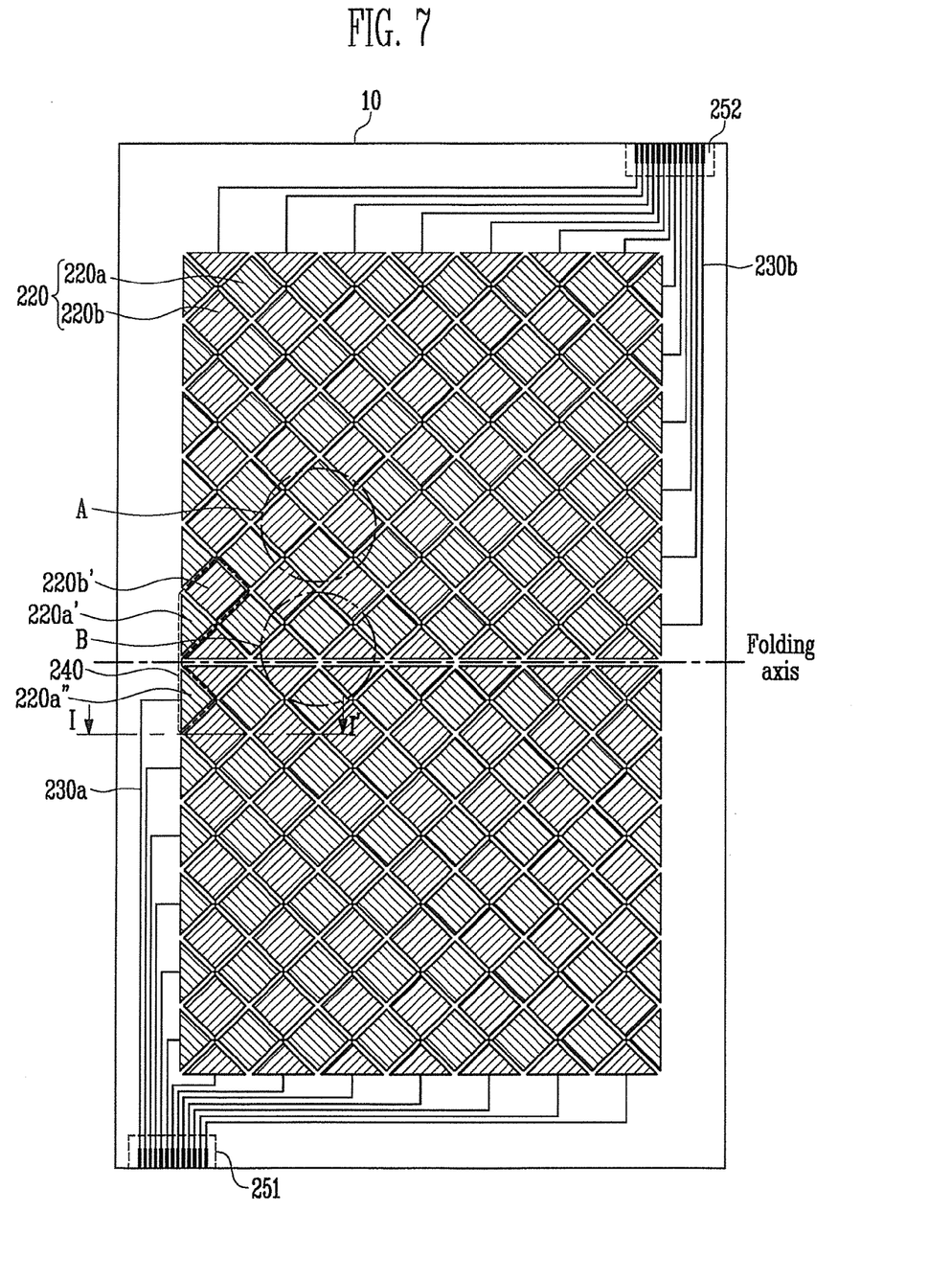
FIG. 7 is a plan view schematically showing a touch screen panel according to another embodiment of the present invention.

FIG. 7 is a plan view schematically showing a touch screen panel according to another embodiment of the present invention.

When comparing the embodiment shown in FIG. 7 with the embodiment shown in FIG. 3, this embodiment is different from the embodiment shown in FIG. 3 in that the touch screen panel is implemented into a structure in which the first and second sensing cells 230a and 230b extending from the first and second active areas are connected to first and second pad portions 251 and 252 provided at lower and upper ends of the non-active area, respectively.

For the convenience of illustration, in this embodiment, components identical to those of the embodiment shown in FIG. 3 are designated by like reference numerals, and their detailed descriptions will be omitted.

That is, in the embodiment of FIG. 7, the first sensing lines 230a extending from the first active area are connected to the first pad portion 251 provided at the lower end of the non-active area, and the second sensing lines 230b extending from the second active area are connected to the second pad portion 252 provided at the upper end of the non-active area. Thus, like the embodiment of FIG. 1, there occurs no region where the sensing lines 230a and 230b intersect or cross the folding axis. Accordingly, the sensing lines are not damaged by the repetitive bending of the touch screen panel along the folding axis.

Figure 8:
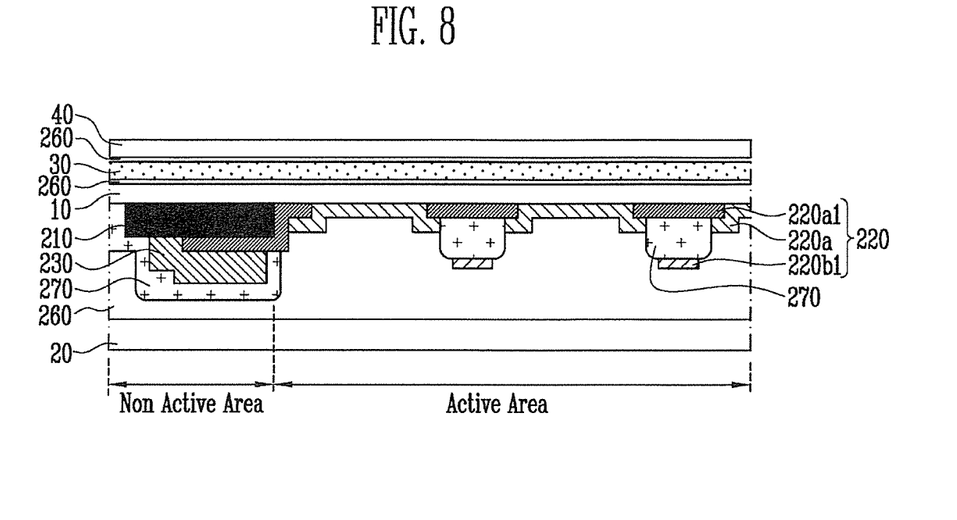
FIG. 8 is a sectional view showing one region of a flexible display device with a touch screen panel according to an embodiment of the present invention.

FIG. 8 is a sectional view showing one region of a flexible display device with a touch screen panel according to an embodiment of the present invention.

Here, the touch screen panel shown in FIG. 8 can be implemented as the touch screen panels according to the embodiments of FIGS. 1, 3 and 7 or any other suitable embodiment based on principles of the present invention.

FIG. 8 is a sectional view showing portions of an active area and a non-active area, which are formed on a first surface of a substrate 10 in the touch screen panel, and shows a section of the flexible display device with the flexible touch screen panel.

In this case, the substrate 10 is implemented using a material having high thermal resistance and chemical resistance, and polyimide (PI) may be used as the material of the substrate 10.

In FIG. 8, there is shown a structure in which a display device 20 is attached to the lower surface of the touch screen panel, i.e., in the direction of the first surface of the substrate 10 by a transparent adhesive layer 260. Here, the display device 20 is a display device having flexibility, and may be implemented as an organic light emitting display device.

For example, the organic light emitting display device is a self-luminescent device, and does not require a backlight unit, unlike existing liquid crystal display devices. Thus, the organic light emitting display device can have flexibility by forming a substrate using polymethyl methacrylate (PMMA), acryl, polyester (PET), etc.

Referring to FIG. 8, sensing patterns 220 formed on the active area of the substrate 10 include first sensing cells 220a formed to be connected for each row line along a row direction (first direction), first connecting lines 220a1 connecting the first sensing cells 220a along the row direction, second sensing cells 220b formed to be connected for each column line along a column direction (second direction), and second connecting lines 220b1 connecting the second sensing cells 220b along the column direction. An insulation layer 270 is interposed between the first connecting lines 220a1 and the second connecting lines 220b1.

In FIG. 8, the thickness of each component such as the sensing patterns 220, included in the touch screen panel, is exaggerated for convenience of illustration. However, the thickness of each practical component is far thinner than the exaggerated thickness.

As shown in FIG. 8, a black matrix 210 and sensing lines 230 are formed on the non-active area positioned at the outside of the active area. Here, the sensing lines 230 are formed to overlap with the black matrix 210, and are electrically connected to the sensing patterns 220.

In this case, the black matrix 210 performs a function of forming the frame of a display area while preventing the visibility of patterns such as sensing lines formed on the non-active area.

According to the structure described above, the touch screen panel is positioned between the display device 20 and the polarizing film 30, so that it is possible to prevent the visibility of the sensing patterns and to reduce or minimize reflectance while maintaining flexibility.

The window substrate 40 attached to a top surface of the polarizing film 30 so as to enhance the strength of the device also has the flexibility of the display device 20 and the touch screen panel. Therefore, the window substrate 40 may be formed of a material having flexibility.

Accordingly, in this embodiment, the window substrate 40 may be made of a material such as PMMA, acryl or PET, and the thickness of the window substrate 40 may be about 0.7 mm.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A flexible touch screen panel comprising:
a substrate comprising an active area and a non-active area around the active area;
sensing patterns on the active area of a first surface of the substrate, the sensing patterns comprising:
first sensing cells coupled together along a first direction;
first connecting lines coupling adjacent ones of the first sensing cells;
second sensing cells coupled together along a second direction; and
second connecting lines coupling adjacent ones of the second sensing cells; and
sensing lines on the non-active area of the first surface of the substrate and coupled to the sensing patterns,
wherein at least one bending sensor is implemented with a plurality of the sensing patterns at an edge region in the active area,
wherein the substrate is configured to be bent along a folding axis in the first direction, and the at least one bending sensor is at a region along the folding axis,
wherein the at least one bending sensor is implemented with two adjacent ones of the first sensing cells and a second sensing cell adjacent one of the two adjacent ones of the sensing cells, and
wherein the folding axis is between the two adjacent ones of the first sensing cells that constitute the at least one bending sensor.

2. The flexible touch screen panel of claim 1, wherein each of the sensing cells at the region along the folding axis is separated into cell portions.

3. The flexible touch screen panel of claim 2, wherein the cell portions are spaced apart from each other along the folding axis and do not overlap with the folding axis.

4. The flexible touch screen panel of claim 2, wherein each of the cell portions comprises a protruding portion that overlaps with the folding axis.

5. The flexible touch screen panel of claim 1, wherein the active area having the sensing patterns thereon comprises a plurality of sub-active areas based on the folding axis.

6. The flexible touch screen panel of claim 5, wherein the sensing patterns on the sub-active areas are configured to be operated while the sensing patterns are separated from each other.

7. The flexible touch screen panel of claim 1, wherein the substrate comprises a polyimide material.

8. The flexible touch screen panel of claim 5, wherein the sensing patterns on different ones of the sub-active areas are coupled to a pad portion by different ones of the sensing lines arranged on different regions of the non-active area.

9. The flexible touch screen panel of claim 8, wherein the different ones of the sensing lines extending from the sub-active areas are coupled to the pad portion located at one end of the non-active area.

10. The flexible touch screen panel of claim 8, wherein different ones of the sensing lines extending from different ones of the sub-active areas are coupled to a plurality of pad portions located at different regions of the non-active area.

11. The flexible touch screen panel of claim 9, wherein a portion of each of the sensing lines crossing the folding axis is branched into a plurality of lines.

12. The flexible touch screen panel of claim 9, wherein a portion of each of the sensing lines crossing the folding axis has a larger width than portions of the sensing lines formed on other regions.

13. The flexible touch screen panel of claim 12, wherein a plurality of holes are formed in the portion having the larger width.

14. The flexible touch screen panel of claim 9, wherein a portion of each of the sensing lines crossing the folding axis is a connecting portion comprising a material different from that of each of the sensing lines, and wherein the connecting portion is electrically coupled to the sensing lines through contact holes.

15. A flexible display device with a flexible touch screen panel comprising:
    a substrate comprising an active area and a non-active area positioned around the active area;
    sensing patterns on the active area of a first surface of the substrate, the sensing patterns comprising:
        first sensing cells coupled together along a first direction;
        first connecting lines coupling adjacent ones of the first sensing cells;
        second sensing cells coupled together along a second direction; and
        second connecting lines coupling adjacent ones of the second sensing cells; and
    sensing lines on the non-active area of the first surface of the substrate and coupled to the sensing patterns,
    wherein at least one bending sensor is implemented with a plurality of the sensing patterns positioned at an edge region in the active area,
    wherein the flexible display device is attached to the flexible touch screen panel so as to face the sensing patterns and the sensing lines in the direction of the first surface of the substrate,
    wherein the substrate is configured to be bent along a folding axis in a first direction, and the at least one bending sensor is at a region along the folding axis,
    wherein the at least one bending sensor is implemented with two adjacent ones of the first sensing cells and a second sensing cell adjacent one of the two adjacent ones of the sensing cells, and
    wherein the folding axis is between the two adjacent ones of the first sensing cells that constitute the at least one bending sensor.

16. The flexible display device of claim 15, wherein the flexible display device is implemented as an organic light emitting display device.

17. The flexible display device of claim 15, wherein a polarizing film and a window substrate are sequentially attached to a second surface of the substrate using a transparent adhesive.

* * * * *